Jan. 4, 1949.　　　K. M. HAMMELL ET AL　　　2,458,471
EMBEDDED HEATING ELEMENT AND
METHOD OF MAKING THE SAME
Filed March 13, 1946　　　　　　　　　　　3 Sheets-Sheet 1
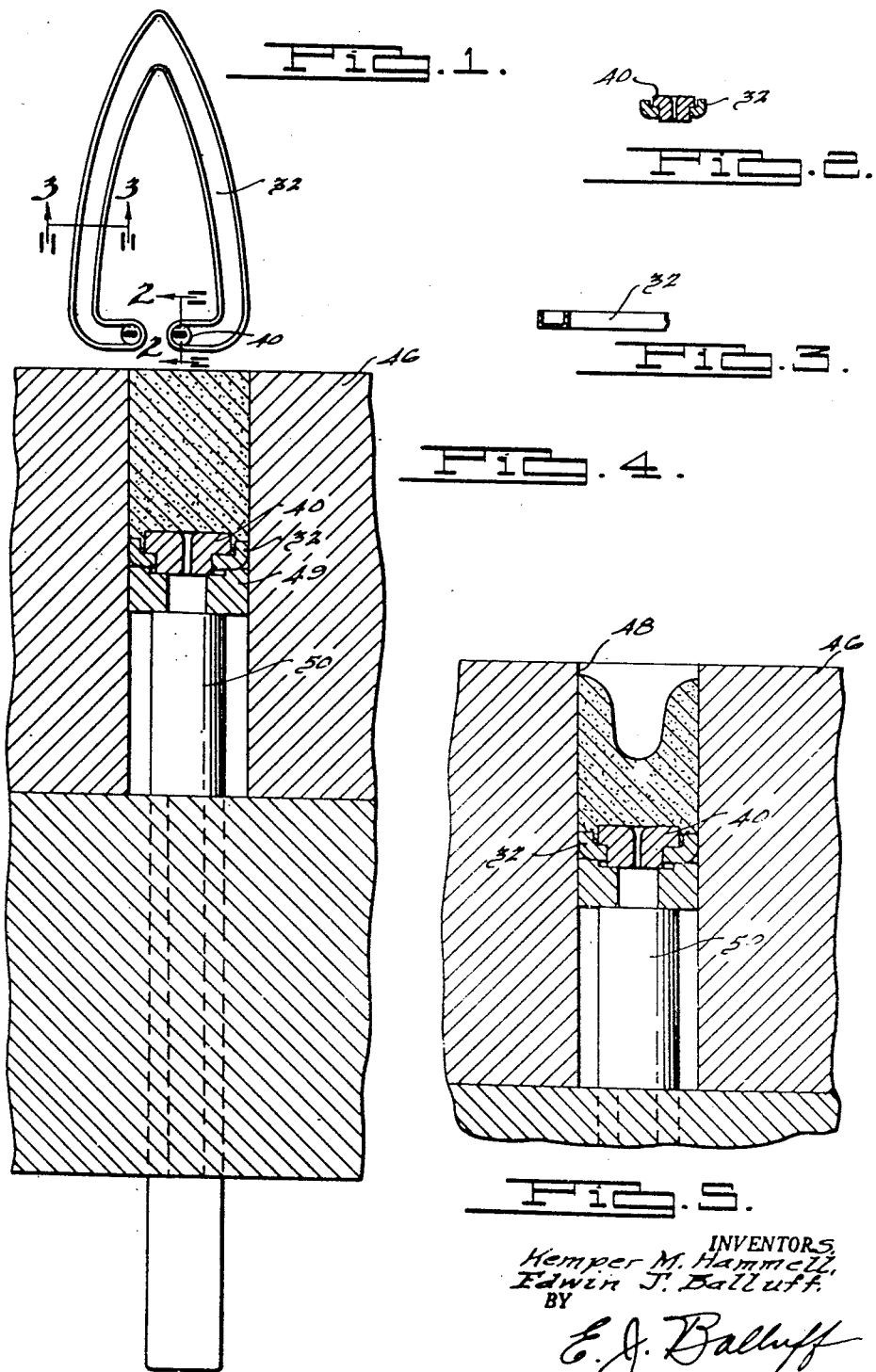
INVENTORS
Kemper M. Hammell,
Edwin J. Balluff.
BY
E. J. Balluff
ATTORNEY.

Jan. 4, 1949. K. M. HAMMELL ET AL 2,458,471
EMBEDDED HEATING ELEMENT AND
METHOD OF MAKING THE SAME
Filed March 13, 1946 3 Sheets-Sheet 2
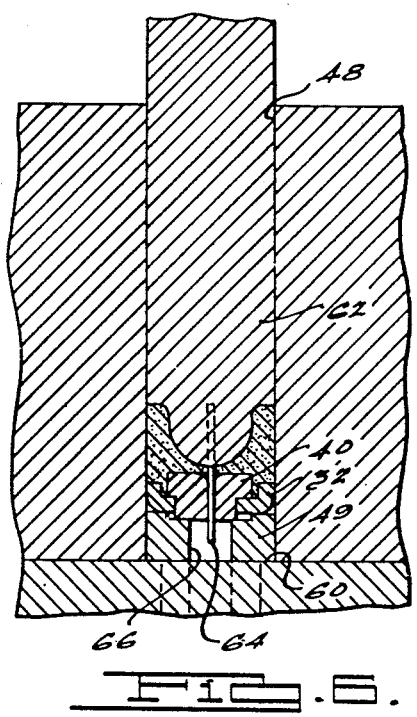
FIG. 6.
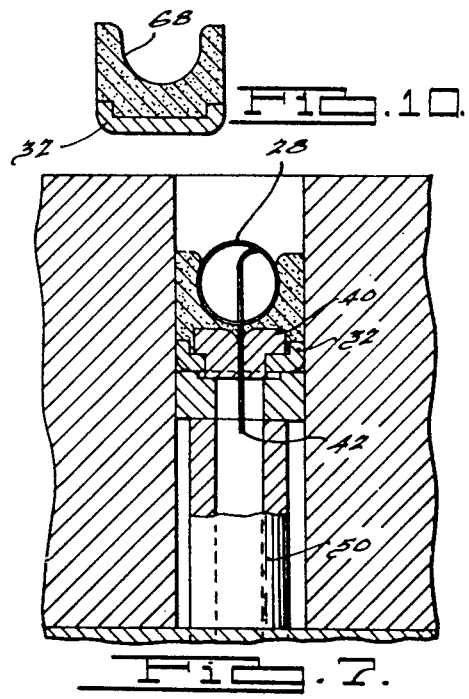
FIG. 10.
FIG. 7.
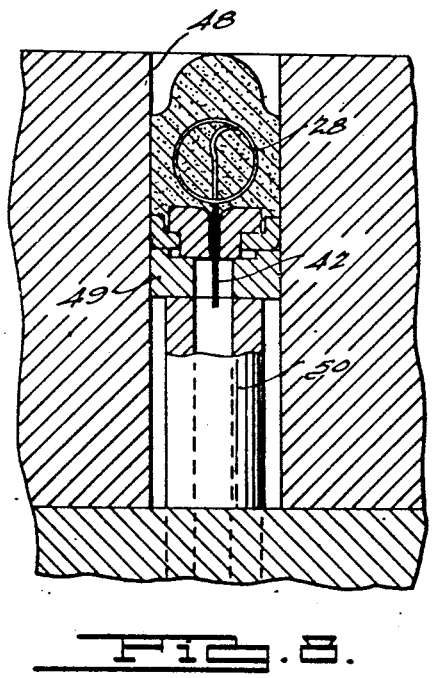
FIG. 8.
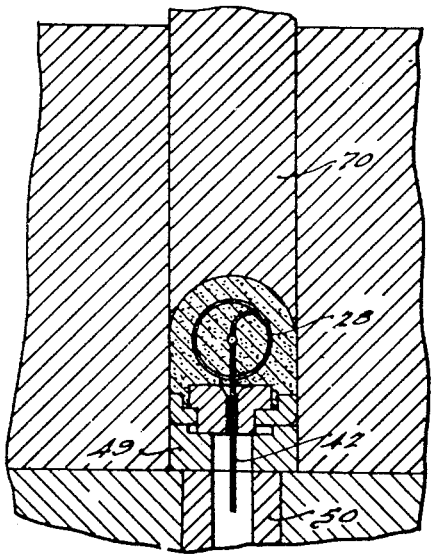
FIG. 9.
INVENTORS,
Kemper M. Hammell,
Edwin J. Balluff,
BY
E. J. Balluff
ATTORNEY.

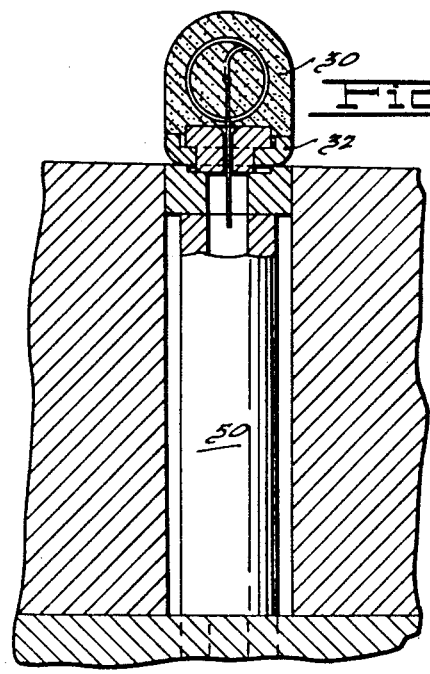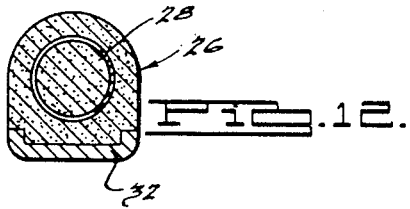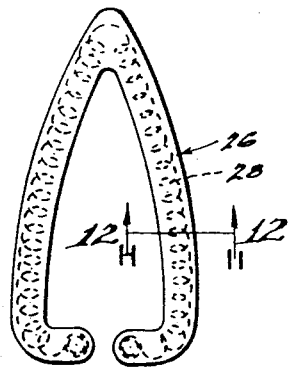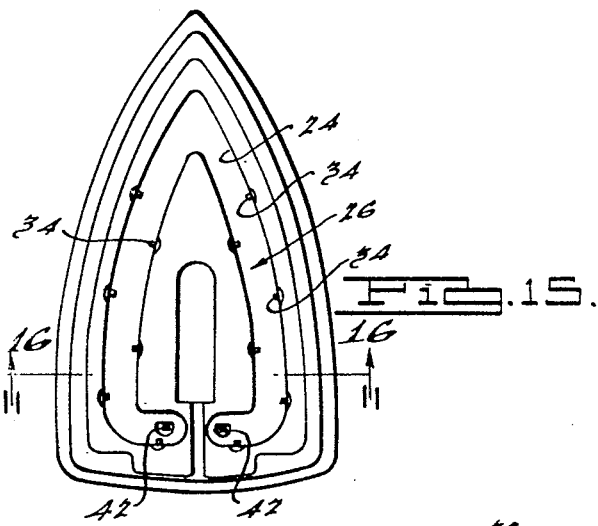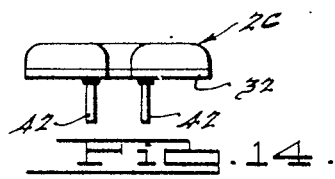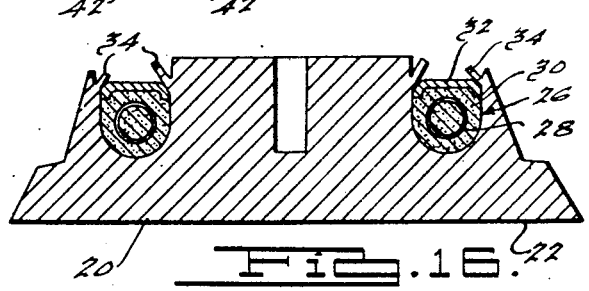

Patented Jan. 4, 1949

2,458,471

UNITED STATES PATENT OFFICE 2,458,471

EMBEDDED HEATING ELEMENT AND METHOD OF MAKING THE SAME

Kemper M. Hammell and Edwin J. Balluff, Detroit, Mich., assignors to Eureka Williams Corporation, Detroit, Mich., a corporation of Michigan Application March 13, 1946, Serial No. 654,110

7 Claims. (Cl. 201—67)

1

This invention relates to an embedded electrical resistance heating element and method of making the same, and, in the embodiment of the invention selected for purposes of illustration, is particularly adapted for use in a laundry iron.

This invention has for its principal object the provision of a new and improved construction for an embedded heating element and a method of making the same whereby the manufacture of irons of this type is simplified, and uniform results may be obtained.

Principal objects of the invention are to provide:

A new and improved embedded electric resistance heating element and a method of making the same;

A new and improved laundry iron of the embedded electric resistance heating element type.

Other and further objects of the invention will be apparent from the following description and claims and will be understood by reference to the accompanying drawings, of which there are three sheets, which, by way of illustration, show a preferred embodiment and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims. We also contemplate that of the several different features of our invention, certain ones thereof may be advantageously employed in some applications separate and apart from the remainder of the features.

In the drawings:

Fig. 1 is a bottom plan view of the armor plate;

Fig. 2 is a sectional view thereof taken along the line 2—2 of Fig. 1;

Fig. 3 is a sectional view taken along the line 3—3 of Fig. 1;

Fig. 4 is a fragmentary sectional view through a die illustrating one step in the process of making the element;

Figs. 5, 6, 7, 8, 9, and 11 are views similar to Fig. 4, illustrating further steps in the method of making the embedded heating element;

Fig. 10 is a sectional view through the element which illustrates the same after the step illustrated in Fig. 6 is completed;

Fig. 12 is a sectional view of the embedded heating element taken along the line 12—12 of Fig. 13;

Fig. 13 is a plan view of the embedded heating

2 element after the step illustrated in Fig. 11 has been completed;

Fig. 14 is an elevational view of the element as it appears in Fig. 13;

Fig. 15 is a plan view of the sole plate of an iron with the embedded heating element arranged therein; and Fig. 16 is a sectional view taken along the line 16—16 of Fig. 15.

As shown in Figs. 15 and 16, an iron embodying the invention comprises a metallic sole plate 20 providing an ironing surface 22 and having a horseshoe-shaped groove or channel 24 in the upper surface thereof. The groove 24 accommodates the embedded electric resistance heating element which is indicated generally at 26 and which comprises an electric resistance wire 28, dielectric material 30 and an armor plate or shield 32 which is retained in position by stakes 34 formed out of the material defining the side walls of the groove 24 and bearing against the top side of the armor plate 32 for retaining the same in the groove 24.

The dielectric material 30 with the resistance wire 28 embedded therein preassembled with the armor plate 32 as shown in Figs. 12, 13 and 14, and then arranged in the groove 24 as illustrated in Figs. 15 and 16. With the element 26 arranged in the groove 24, pressure is applied to the armor plate 32 so as to press the dielectric 30 into firm and close relationship with the wall defining the groove 24 and while the armor plate 32 is subjected to pressure, the stakes 34 are formed and bent into engagement with the armor plate so as to firmly secure the armor plate 32 and the element 26 in the groove 24. The stakes 34 are formed by any suitable staking tool. A number of stakes are formed along the length of the element 26 so that the plate 32 may not yield in one place due to pressure developed at another place. The armor plate 32 comprises a metallic stamping which is U-shaped in cross-section and when assembled in the iron, the channel in the plate 32 is inverted. The width of the plate 32 is such as to completely span the width of the groove 24 so that the sides of the plate 32 will have firm engagement with the side walls of the channel 24.

As will be observed from Figs. 12, 13 and 14, the element 26 is pre-formed before it is arranged in the groove 24 in the iron so that during manufacture, the operations involved in compressing the dielectric 30 and embedding the resistance wire 28 therein may be performed separate and apart from the assembly of the element 26 to the sole plate 20. In this manner, the dielectric material 30 which in a non-compressed state is dusty and of an abrasive nature may be readily kept away from the final assembly operations.

The ends of the armor plate are provided with holes for accommodating insulating bushings 40 which project through the holes as clearly indicated in Figs. 4 and 5 and function to insulate the terminals 42 of the wire 28 from the armor plate 32. In forming and assembling the dielectric with the armor plate 32, use is made of a die 46 having a channel 48 therein which conforms with the shape of the plate 32 and is adapted for receiving the same.

Figs. 4, 5, 6, 7, 8, 9, 10 and 11 represent sections through the die at the part thereof which accommodates one of the end portions of the plate 32. The die 46 is provided with a member 49 mounted on a plurality of vertically movable pins such as the pin 50. The pins are mounted for movement in guides provided in the lower part of the die and suitable means are provided for vertically positioning and adjusting the pins 50. The member 49 is adapted to form a seat for the plate 32 with the channel portion thereof facing upwardly. Previous to the arrangement of the plate 32 in the channel 48, the bushings 40 are arranged in the plate 32. With the parts arranged as illustrated in Fig. 4, the channel 48 above the plate 32 is filled with a suitable quantity of powdered or granular dielectric material, such as dry or slightly moistened zirconium silicate. The dielectric material in the channel 48 is properly distributed and formed by a suitable rake to approximately the shape and size illustrated in Fig. 5.

After the step illustrated in Fig. 5 has been completed, the pins 50 may be released so that the member 49 may seat on a shoulder 60 in the bottom of a channel 48. Thereafter, a die 62 as shown in Fig. 6 is employed to further form and compress the dielectric so as to provide a form therefor as shown in Fig. 10. The die 62 at each end is provided with a pin 64 which pierces the dielectric and projects through the holes in the bushings 40 so as to provide a path through which the terminals 42 of the wire may extend. To accommodate the pins 64, the member 49 is provided with hollow portions 66, one of which is shown in Fig. 6.

The channel or groove 68 in the dielectric formed by die 62 is for accommodating the electric resistance wire 28 which is in the form of a coil. A suitable length of wire in the form of a coil and having terminals 42 formed thereon is pre-formed and then laid in the groove 68 with the terminals 42 projecting through the holes in the bushings 40, the hollow portions 66 of the members 49, and into the hollow pins 50.

Thereafter, the channel 48 is again filled with a suitable additional quantity of dielectric material, it being observed that such material fills the space enclosed by the coil of wire 28. Thereafter, the additional dielectric material is raked to the form as shown in Fig. 8, and finally compressed to the form as shown in Fig. 9 by a die 70. In the step illustrated in Fig. 9, the dielectric material is compressed sufficiently to form a hard solid mass of substantially uninform density in which the coil of resistance wire 28 is embedded. It will be noted that the shape of the mold and the dies employed in forming the dielectric material into the hard solid mass, as is shown by Figs. 4 to 12 of the drawings, is such that the exterior surface of the mass is practically of uniform thickness in all directions outwardly with respect to the shape of the coil 28, and on the side thereof opposite the armor plate 32, is of relatively equal thickness throughout the extent of a semi-annular segment thereof (see Fig. 12).

After the die 70 is retracted, the pins 50 are raised so as to eject the armor plate 32 and the dielectric material 30 from the die as shown in Fig. 11. At this stage, the dielectric material 30, plate 32 and resistance wire 28 comprise a pre-formed unit which is ready for insertion in the channel 24 of the iron. The pressure to which the dielectric material 30 has been subjected is sufficient to form a hard mass and to unite the same with the plate 32 so that the unit 26 as illustrated in Figs. 12, 13 and 14 may be handled and assembled into the channel 24 in the sole plate 20.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

We claim:

1. An embedded electric resistance heating element comprising a member having a channel therein, a preformed unit comprising an armor plate and a compacted mass of dielectric material having an electric resistance element embedded therein, said unit being arranged in said channel with the dielectric material engaging the sides and bottom of said channel and with said armor plate extending across said channel and overlying said dielectric material, said armor plate being channel-shaped in cross-section with the sides thereof extending downwardly into said channel and in engagement with the side walls thereof, said walls of said channel being provided with stakes which bear against the upper side of the armor plate along both edges thereof for securing said unit under pressure in said channel in said member.

2. An embedded electric resistance heating element according to the construction set forth in claim 1 wherein insulated bushings are arranged in said armor plate and the terminals of said electric resistance element extend through said bushings.

3. An embedded electric resistance heating element for an iron comprising a sole plate having a channel therein, a preformed unit comprising an armor plate and a compacted mass of dielectric material having an electric resistance element embedded therein, said unit being arranged in said channel with the dielectric material engaging the sides and bottom of said channel and with said armor plate extending across said channel and overlying said dielectric material, said armor plate being channel-shaped in cross section with the sides thereof extending downwardly into said channel and in engagement with the side walls thereof, and means bearing against the upper side of the armor plate along both edges thereof for securing said unit under pressure in said channel in said sole plate.

4. The method of making an embedded electric resistance heating element which comprises arranging a channel-shaped armor plate in a slot in a mould, filling the channel of the plate and at least part of the slot with loose dielectric material, initially forming said material against the armor plate, compressing said material against said armor plate to form a channel in the dielectric material, arranging a resistance element in said channel in said material, covering said element with dielectric material, compacting said material about said element and against said armor plate so as to form a hard substantially solid mass with a portion thereof embedded in the channel of the armor plate and so that such dielectric material with the resistance element embedded therein and said armor plate form a unit, removing said unit from said mould, assembling said unit in a channel of a sole plate in which the bottom of the channel is of substantially the same cross-section as the cross-section of the compacted material and with the armor plate extending across the open side of the channel so as to close the same, applying pressure to the armor plate to bring the compacted dielectric material into intimate engagement with the side walls of the channel and staking the armor plate in said channel.

5. The method of making an embedded electric resistance heating element which comprises arranging a channel-shaped armor plate in a mould, filling the channel of the plate and at least part of said mould with loose dielectric material, compressing said material against said armor plate to form a channel in the dielectric material, arranging a resistance element in said channel in said material, adding more dielectric material to said mould so as to cover said element, compacting said material about said element and against said armor plate so as to form a hard substantially solid mass with a portion thereof embedded in the channel of the armor plate and so that such dielectric material with the resistance element embedded therein and said armor plate form a unit, removing said unit from said mould, assembling said unit in a channel of a sole plate in which the bottom of the channel is of substantially the same cross-section as the cross-section of the compacted material and with the armor plate extending across the open side of the channel so as to close the same, applying pressure to the armor plate to bring the compacted dielectric material into intimate engagement with the side walls of the channel and securing said unit under pressure in said channel.

6. An embedded electric resistance heating element comprising a metallic heat distributing member having a planular heat transfer surface on one side thereof, a single spirally wound electric resistance element disposed within said distributing member, said resistance element presenting to said transfer surface a succession of parallel arcuate resistance segments, a compacted mass of dielectric material disposed within said resistance element and between said resistance element and said distributing member, said mass toward said distributing element being of relatively uniform thickness in all directions between said segments and the adjacent metallic surface of said member, said mass toward said heat transfer surface and between said segments and said adjacent metallic surface being in the form of an arcuate annular segment of relatively uniform thickness, said mass being compressed between said resistance element and said distributing member to provide therebetween intimate thermal contact in all directions, said member between said mass and said heat transfer surface being of uniform and continuous metallic molecular formation.

7. A method of making an embedded electric resistance heating element which comprises compacting into an elongated mold slot a first quantity of loose dielectric material, said material during said compacting operation being formed to provide an arcuate channel extending longitudinally of said slot, the opposite sides of said channel being formed equidistantly from the adjacent opposite sides of said slot, arranging in said channel an electric resistance element of spirally wound formation, compacting a second quantity of loose dielectric material into an elongated mold slot upon said resistance element and said first compacted material to provide a composite unit, said material during said second compacting operation being compressed within the convolutions of said resistance element and within said channel, one of said compacted masses of material being formed during said compacting operations to provide an exterior surface having an arcuate configuration and having radii of curvature greater than said channel but concentrically disposed relative thereto, and then embedding said compacted composite unit so formed within a metallic heat distributing element having a planular heat transfer surface formed on one side thereof, said unit being embedded in said distributing unit under compression with said arcuate exterior surface disposed adjacent but in spaced relation to said transfer surface, said embedding operation entirely enclosing said unit between opposite ends thereof in said distributing element with said arcuate exterior surface in intimate thermal contact with the metallic molecular structure of said distributing element opposite said transfer surface.

KEMPER M. HAMMELL.
EDWIN J. BALLUFF.

REFERENCES CITED

The following references are of record in the file of this patent:

UNITED STATES PATENTS

| Number | Name | Date |
|---|---|---|
| 1,979,631 | Maurer | Nov. 6, 1934 |
| 2,048,614 | Myers | July 21, 1936 |
| 2,222,192 | Arnold et al. | Nov. 19, 1940 |
| 2,277,439 | Jepson | Mar. 24, 1942 |
| 2,299,596 | Rycroft | Oct. 20, 1942 |